United States Patent
Chien (10) Patent No.: US 10,802,328 B2
(45) Date of Patent: Oct. 13, 2020

(54) METHOD FOR MANUFACTURING DISPLAY PANEL AND BAKING DEVICE FOR DISPLAY PANEL

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 17 days.

(21) Appl. No.: 16/304,138

(22) PCT Filed: Apr. 20, 2017

(86) PCT No.: PCT/CN2017/081225
§ 371 (c)(1),
(2) Date: Nov. 22, 2018

(87) PCT Pub. No.: WO2018/120529
PCT Pub. Date: Jul. 5, 2018

(65) Prior Publication Data
US 2019/0339569 A1    Nov. 7, 2019

(30) Foreign Application Priority Data

Dec. 29, 2016    (CN) .......................... 2016 1 1254562

(51) Int. Cl.
G02F 1/1335    (2006.01)
G02F 1/13      (2006.01)

(52) U.S. Cl.
CPC ...... G02F 1/133516 (2013.01); G02F 1/1303 (2013.01)

(58) Field of Classification Search
CPC ......................... G02F 1/1303; G02F 1/133516
See application file for complete search history.

(56) References Cited

U.S. PATENT DOCUMENTS

2005/0012889 A1*  1/2005  Ishii .................... G02F 1/13394
                                                        349/156
2008/0142500 A1*  6/2008  Tomita .............. H01L 21/67109
                                                        219/444.1

FOREIGN PATENT DOCUMENTS

| CN | H04118630 A   | 4/1992  |
| CN | JP2003297267 A| 10/2003 |
| CN | 102262320 A   | 11/2011 |
| CN | 102778783 A   | 11/2012 |
| CN | 104570499 A   | 4/2015  |

(Continued)

OTHER PUBLICATIONS

Qian Liu, the International Searching Authority written comments, dated Sep. 2017, CN.

Primary Examiner — Joseph L Williams
Assistant Examiner — Jacob R Stern (57) ABSTRACT

The application discloses a method for manufacturing a display panel and a baking device for a display panel. The method for manufacturing the display panel includes: coating a color filter on a transparent substrate of a display panel; patterning and solidifying the color filter to form at least one support unit, and baking the support unit until the support unit is lowered to a predetermined height.

18 Claims, 6 Drawing Sheets

(56) References Cited

FOREIGN PATENT DOCUMENTS

| | | | |
|---|---|---|---|
| CN | 104570503 | A | 4/2015 |
| JP | 2003330030 | A | 11/2003 |
| JP | 200671295 | A | 3/2006 |
| KR | 20130054680 | A | 5/2013 |

* cited by examiner

METHOD FOR MANUFACTURING DISPLAY PANEL AND BAKING DEVICE FOR DISPLAY PANEL

TECHNICAL FIELD

The application relates to the technical field of displays, and particularly relates to a method for manufacturing a display panel and a baking device for a display panel.

BACKGROUND

Liquid crystal display apparatuses have numerous advantages, such as a thin body, power savings, no radiation, etc., and are widely used. Most liquid crystal display apparatuses in the current market are backlit liquid crystal display apparatuses, each including a liquid crystal panel and a backlight module. Working principle of the liquid crystal panel is that liquid crystals are put in two parallel glass substrates, and a driving voltage is applied to the two glass substrates to control rotational direction of the liquid crystals, to refract light rays of the backlight module to generate a picture.

Thin film transistor liquid crystal display apparatuses (TFT-LCD apparatuses) currently maintain a leading status in the display field because of low power consumption, excellent picture quality, high production yield, and other properties. Similarly, the thin film transistor liquid crystal display apparatus comprises a liquid crystal panel and a backlight module. The liquid crystal panel comprises a color filter substrate (CF substrate) and a thin film transistor substrate (TFT substrate), and transparent electrodes on respective inner sides of the above substrates. A layer of liquid crystals (LCs) is positioned between two substrates. The liquid crystal panel changes a polarized state of light by controlling direction of the LCs through an electric field, for penetration and obstruction of a light path via a polarized plate to display.

In the method for manufacturing the existing liquid crystal panel, for example, in the method for manufacturing a color filter substrate, a color filter layer (for example: R/G/B color filter), a light shield layer [for example: black matrix (BM) layer, also called black matrix] and a support layer [for example: photo spacer (PS) color filter] are achieved by coating, exposing and developing a color filter for many times, to form a finished product of the color filter substrate. Where in the method for manufacturing the support layer, the color filter is in a wet film state after being coated, the wet film state causes bending of a transparent substrate in the color filter substrate because of the abnormal sorption of a vacuum mechanism, and overflow and accumulation of the color filter cause local PS filter (or PS color filter) to be slightly high in thickness, causing abnormal phenomena of slightly white and nonuniform lighting of the liquid crystal panel. There is no manner to correct the slightly high thickness of the current PS filter. Thus, the application aims to find a manner to correct the slightly high thickness of the PS filter, to prevent poor lighting of the liquid crystal panel.

SUMMARY

A technical problem to be solved by the application is to provide a method for manufacturing a display panel, to prevent the problem of poor lighting of a display panel.

Furthermore, the application further provides a baking device for a display panel.

The aim of the application is realized by the following methods.

According to one aspect of the application, the application discloses a method for manufacturing a display panel, the method for manufacturing comprising:

coating a color filter on a transparent substrate of a display panel;

patterning and solidifying the color filter to form at least one support unit; and baking the support unit until the support unit is lowered to a predetermined height.

The step of baking the support unit until the support unit is lowered to a predetermined height comprises:

measuring the height of each support unit; and baking a support unit with an abnormal height until the support unit is lowered to the predetermined height. In the application, before the support unit is baked, the height of each support unit is measured first, and if the height of a support unit is identical to the predetermined height, a support unit with a normal height is not required to be baked. However, if the height of a support unit is greater than the predetermined height, i.e. the support unit has an abnormal height, the support unit with an abnormal height is baked until the support unit with an abnormal height is lowered to the predetermined height. In this way, the support unit with a normal height may be omitted, thereby saving the time of the baking and improving the working efficiency.

The step of baking the support unit until the support unit is lowered to a predetermined height: the strength of the baking is unchanged, and the support unit is lowered to the predetermined height by controlling the time of the baking. This is one specific manner of baking a support unit with an abnormal height. The strength of the baking is adjusted to an appropriate strength, the support unit with an abnormal height is gradually contracted by controlling the time of the baking, and until the support unit with an abnormal height is lowered to the predetermined height to form a support unit with a normal height, baking is completed. In the baking process, time may be easily controlled, and a slight-adjustment correction effect may be achieved, so that the difference between the height of the support unit after slight-adjustment correction and the predetermined height is further reduced.

The step of baking the support unit until the support unit is lowered to a predetermined height: the time of the baking is unchanged, and the support unit is lowered to the predetermined height by controlling the strength of the baking. This is the other specific manner of baking a support unit with an abnormal height. The time of the baking is set, the support unit with an abnormal height is contracted by controlling the strength of the baking, and until the support unit is lowered to the predetermined height, baking is completed. In the baking process, the strength of the baking may be controlled as well, and the slight-adjustment correction effect may be achieved as well, so that the difference between the height of the support unit after slight-adjustment correction and the predetermined height is further reduced.

The step of baking the support unit until the support unit is lowered to a predetermined height: the support unit is baked using infrared rays. The baking effect of infrared rays is good.

The step of baking the support unit until the support unit is lowered to a predetermined height: the support unit is baked using microwaves. The baking effect of microwaves is good.

The step of baking the support unit until the support unit is lowered to a predetermined height: the support unit is baked using infrared rays. The baking effect of ultraviolet rays is good.

According to another aspect of the application, the application further discloses a baking device for a display panel, the baking device comprising:

a heating unit used for generating heat;

a baking unit connected to the heating unit and used for baking a support unit of the display panel until the support unit is lowered to a predetermined height; and a control unit used for controlling the heating unit.

The heating unit comprises a microwave emitter.

The heating unit comprises an infrared ray emitter.

The heating unit comprises an ultraviolet ray emitter.

The baking device further comprises a housing sleeved on the periphery of the baking unit. The baking device can preferably achieve the effect of local baking through the housing.

The baking device further comprises a measurement unit connected to the control unit and used for measuring the height of each support unit.

A PS filter formed in the method for manufacturing the display panel in the prior art is slightly high in thickness, causing abnormal phenomena of slightly white and nonuniform lighting of the display panel. Compared with the prior art, the application has the technical effects that:

In the method for manufacturing the display panel of the application, after the color filter is patterned and solidified to form a support unit, the support unit is baked, where the support unit contracts in the baking process, which lowers the support unit, until the support unit is lowered to a predetermined height. In the application, slight-adjustment correction performed on the support unit is achieved by baking the support unit, to prevent the support unit from being slightly high in local part, and then prevent undesirable phenomena of slightly white and nonuniform lighting of the display panel, so that the display panel can normally display.

Furthermore, in the application, by locally baking the support unit, the strength of the baking and baking time may be easily controlled in the baking process, and the support unit may be more accurately controlled, so that the contraction effect of the support unit is preferable.

BRIEF DESCRIPTION OF DRAWINGS

The drawings included are used for providing further understanding of embodiments of the present application, constitute part of the description, are used for illustrating implementation manners of the present application, and interpreting principles of the present application together with text description. Apparently, the drawings in the following description are merely some embodiments of the present application, and for those of ordinary skill in the art, other drawings can also be obtained according to the drawings without contributing creative labor. In the drawings.

Legends: 100. baking device; 110. control unit; 120. heating unit; 130. baking unit; 140. housing; 150. measurement unit; 210. transparent substrate; 220. first support unit; 230. second support unit; 300. standard support unit.

DETAILED DESCRIPTION

Specific structure and function details disclosed herein are only representative and are used for the purpose of describing exemplary embodiments of the application. However, the application may be specifically achieved in many alternative forms and shall not be interpreted to be only limited to the embodiments described herein.

It should be understood in the description of the application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the application and the simplification of the description rather than to indicate or imply that the indicated device or element must have a specific direction or constructed and operated in a specific direction, and therefore, shall not be understood as a limitation to the application. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the application, the meaning of "a plurality of" is two or more unless otherwise specified. In addition, the term "comprise" and any variant are intended to cover non-exclusive inclusion.

It should be noted in the description of the application that, unless otherwise specifically regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the application may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

A method for manufacturing a display panel and a baking device for a display panel of the application are described below with reference to FIG. 1 to FIG. 4.

The applicant has designed a method for manufacturing a display panel, to lower a support unit with an abnormal height, specifically, a part of the support unit is removed by tape grinding to lower the support unit. Since the error of the support unit removed in the course of tape grinding is large, slightly adjusting the height cannot be achieved, thereby easily causing a slightly low height of the support unit and then causing abnormal phenomena of slightly black and non-uniform lighting of the display panel.

Furthermore, the applicant also designed a method for manufacturing a display panel, to lower a support unit having an abnormal height, specifically, a part of the support unit is removed by emitting laser beams by a laser to lower the support unit. Since the difference thereof in the course of removing the support unit using the laser is also large, slightly adjusting the height cannot be achieved, thereby easily causing the slightly low height of the support unit and then causing abnormal phenomena of slightly black and non-uniform lighting of the display panel.

Therefore, the applicant further designs another technical solution for solving the above technical problem, specifically:

The application will be further described in detail below in combination with FIG. 1 to FIG. 5 and preferred embodiments.

Figure 1:
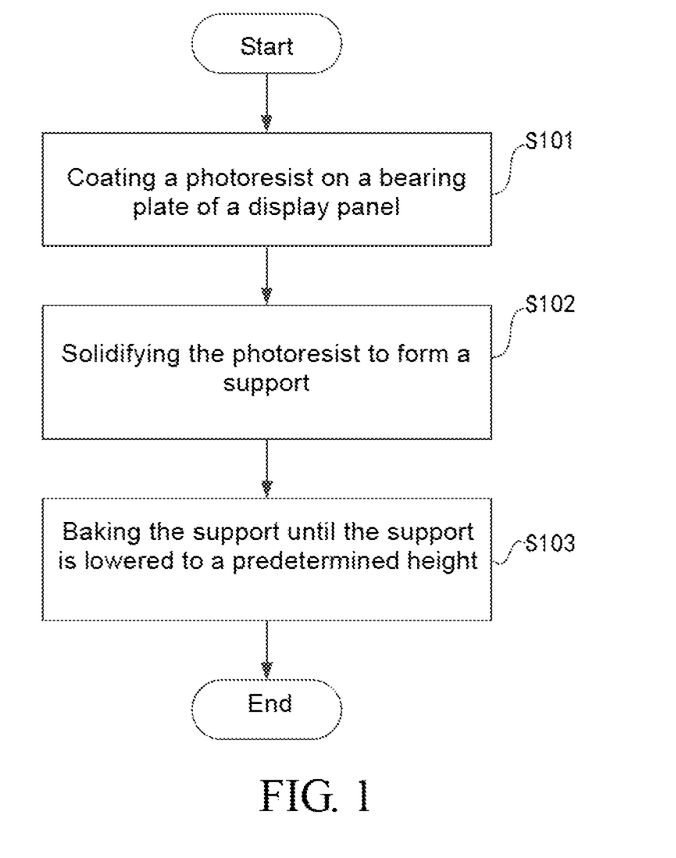
FIG. 1 is a flowchart of a method for manufacturing a display panel of an embodiment of the application.

According to an embodiment of the application, as shown in FIG. 1, an embodiment of the application discloses a method for manufacturing a display panel, the method for manufacturing comprising Step S101, Step S102 and Step S103, specifically:

Step S101: coating a color filter on a transparent substrate of a display panel;

Step S102: patterning and solidifying the color filter to form at least one support unit; and Step S103: baking the support unit until the support unit is lowered to a predetermined height.

In Step S101, the transparent substrate in the present embodiment is preferably a glass substrate, since glass substrates have advantages of good light transmittance and convenient arrangement. Of course, the transparent substrate in the present embodiment may be a flexible substrate as well. It should be noted that the transparent substrate in the present embodiment is not limited thereto.

The display panel in an embodiment of the application may include any of the following: a twisted nematic (TN) or super twisted nematic (STN) type panel, an in-plane switching (IPS) type panel, a vertical alignment (VA) type panel, a high vertical alignment (HVA) type panel and a curved surface type panel.

In Step S102, the color filter coated on the transparent substrate is patterned and solidified to form a support unit. In the process of coating the color filter to form at least one support unit, the height of the support unit easily exceeds a predetermined height. The color filter forming support units in an embodiment of the application is a photo spacer (PS) color filter.

In Step S103, the support unit formed by the color filter is baked until the support unit is lowered to a predetermined height. The predetermined height is set according to the requirements of the display panel, so that the display panel can normally display.

In the method for manufacturing the display panel in an embodiment of the application, after the color filter is patterned and solidified to form a support unit, the support unit is baked, where the support unit contracts in the baking process, which lowers the support unit, until the support unit is lowered to a predetermined height. In an embodiment of the application, slight-adjustment correction performed on the support unit is achieved by baking the support unit, to prevent the support unit from being slightly high in local portion, and then prevent undesirable phenomena of slightly white and nonuniform lighting of the display panel, so that the display panel can normally display.

Furthermore, in an embodiment of the application, by locally baking the support unit, the strength and time of the baking may be easily controlled in the baking process, and the support unit may be more accurately controlled, so that the contraction effect of the support unit is preferable.

Further, in an embodiment of the application, in Step S103, the strength of the baking is unchanged, and the support unit is lowered to the predetermined height by controlling the time of the baking. This is one specific manner of baking a support unit. The strength of the baking is adjusted to an appropriate strength, the support unit is gradually contracted by controlling time of the baking, and until the support unit is lowered to the predetermined height to form a support unit with a normal height, baking is completed. In the baking process, time may be easily controlled, and a slight-adjustment correction effect may be achieved, so that the difference between the height of the support unit after slight-adjustment correction and the predetermined height is further reduced.

However, it should be noted that the manner of baking the support unit in an embodiment of the application is not limited thereto. For example, the time of the baking is unchanged, and the support unit is lowered to the predetermined height by controlling the strength of the baking. The time of the baking is set, the support unit is contracted by controlling the strength of the baking, and until the support unit is lowered to the predetermined height, baking is completed. In the baking process, the strength of the baking may be controlled as well, and the slight-adjustment correction effect may be achieved as well, so that the difference between the height of the support unit after slight-adjustment correction and the predetermined height is further reduced.

In an embodiment of the application, the support unit is baked using any of infrared rays, ultraviolet rays and microwaves. The baking effect of infrared rays, ultraviolet rays or microwaves is good.

Figure 2:
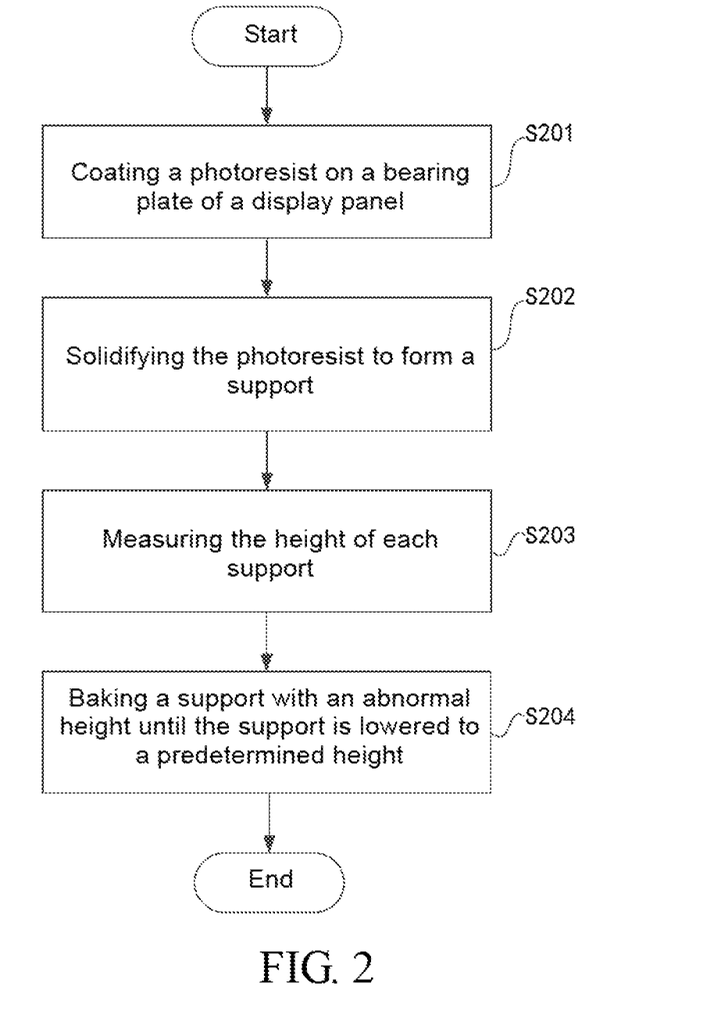
FIG. 2 is a flowchart of a method for manufacturing a display panel of an embodiment of the application.

According to an embodiment of the application, as shown in FIG. 2, an embodiment of the application discloses a method for manufacturing a display panel, the method for manufacturing comprising Step S201, Step S202, Step S203 and Step S204, specifically:

Step S201: coating a color filter on a transparent substrate of a display panel;

Step S202: patterning and solidifying the color filter to form at least one support unit;

Step S203: measuring the height of each support unit; and

Step S204: baking a support unit with an abnormal height until the support unit is lowered to a predetermined height.

In Step S201, the transparent substrate in the present embodiment is a glass substrate preferably, since the glass substrate has the advantages of good light transmittance and convenient arrangement. Of course, the transparent substrate in the present embodiment may be a flexible substrate as well. It should be noted that the transparent substrate in the present embodiment is not limited thereto.

The display panel in an embodiment of the application may include any of the following: a twisted nematic (TN) or super twisted nematic (STN) type panel, an in-plane switching (IPS) type panel, a vertical alignment (VA) type panel, a high vertical alignment (HVA) type panel and a curved surface type panel.

In Step S202: the color filter coated on the transparent substrate is patterned and solidified to form a support unit. In the process of coating the color filter to form at least one support unit, the height of the support unit easily exceeds a predetermined height. The color filter forming support units in an embodiment of the application is a photo spacer (PS) color filter.

In step S203, in an embodiment of the application, before the support unit is baked, the height of each support unit is measured first, and if the height of a support unit is identical to the predetermined height, a support unit with a normal height is not required to be baked. However, if the height of a support unit is greater than the predetermined height, the support unit is classified as a support unit with an abnormal height, and go to the next step.

In Step S204, if the height of the support unit is greater than the predetermined height, i.e. the support unit has an abnormal height, the support unit with an abnormal height is baked until the support unit with an abnormal height is lowered to the predetermined height. In this way, the support unit with a normal height may be omitted, thereby saving the time of the baking and improving the working efficiency.

In the method for manufacturing the display panel in an embodiment of the application, after the color filter is patterned and solidified to form a support unit, the support unit is baked, where the support unit contracts in the baking process, which lowers the support unit, until the support unit is lowered to a predetermined height. In an embodiment of the application, slight-adjustment correction performed on the support unit is achieved by baking the support unit, to prevent the support unit from being slightly high in local part, and then prevent undesirable phenomena of slightly white and nonuniform lighting of the display panel, so that the display panel can normally display.

Furthermore, in an embodiment of the application, by locally baking the support unit, the strength of the baking and baking time may be easily controlled in the baking process, and the support unit may be more accurately controlled, so that the contraction effect of the support unit is preferable.

Further, in an embodiment of the application, in Step S204, the strength of the baking is unchanged, and the support unit with an abnormal height is lowered to the predetermined height by controlling the time of the baking. This is one specific manner of baking a support unit with an abnormal height. The strength of the baking is adjusted to an appropriate strength, the support unit with an abnormal height is gradually contracted by controlling the time of the baking, and until the support unit with an abnormal height is lowered to the predetermined height to form a support unit with a normal height, baking is completed. In the baking process, time may be easily controlled, and a slight-adjustment correction effect may be achieved, so the difference between the height of the support unit after slight-adjustment correction and the predetermined height is further reduced.

However, it should be noted that the manner of baking the support unit in an embodiment of the application is not limited thereto. For example, the time of the baking is unchanged, and the support unit with an abnormal height is lowered to the predetermined height by controlling the strength of the baking. The time of the baking is set, the support unit is contracted by controlling the strength of the baking, and until the support unit is lowered to the predetermined height, baking is completed. In the baking process, the strength of the baking may be controlled as well, and the slight-adjustment correction effect may be achieved, so that the difference between the height of the support unit after slight-adjustment correction and the predetermined height is further reduced.

In an embodiment of the application, the support unit with an abnormal height is baked using any of infrared rays, ultraviolet rays and microwaves. The baking effect of infrared rays, ultraviolet rays or microwaves is good.

Figure 3:
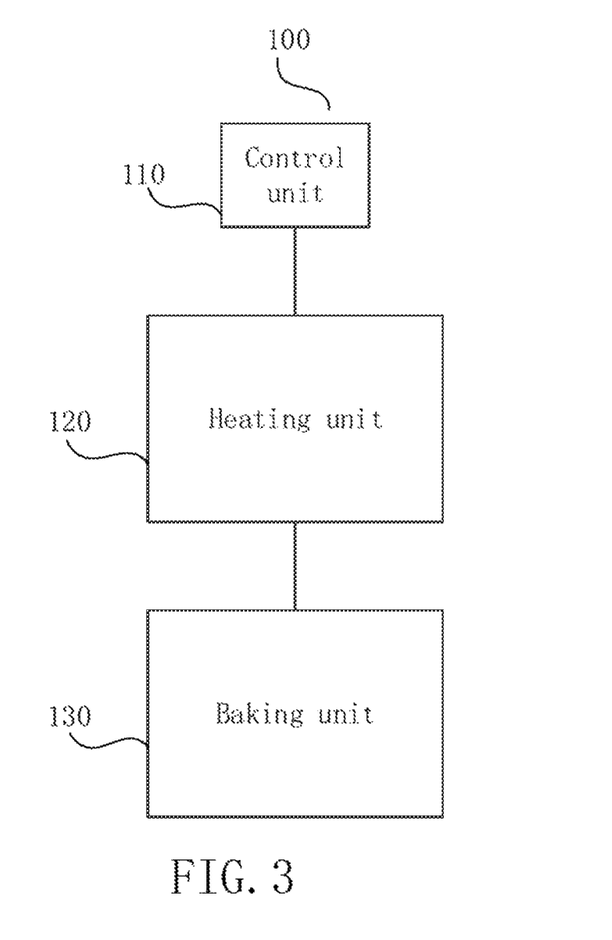
FIG. 3 is a schematic diagram of a baking device for a display panel of an embodiment of the application.
Figure 4:
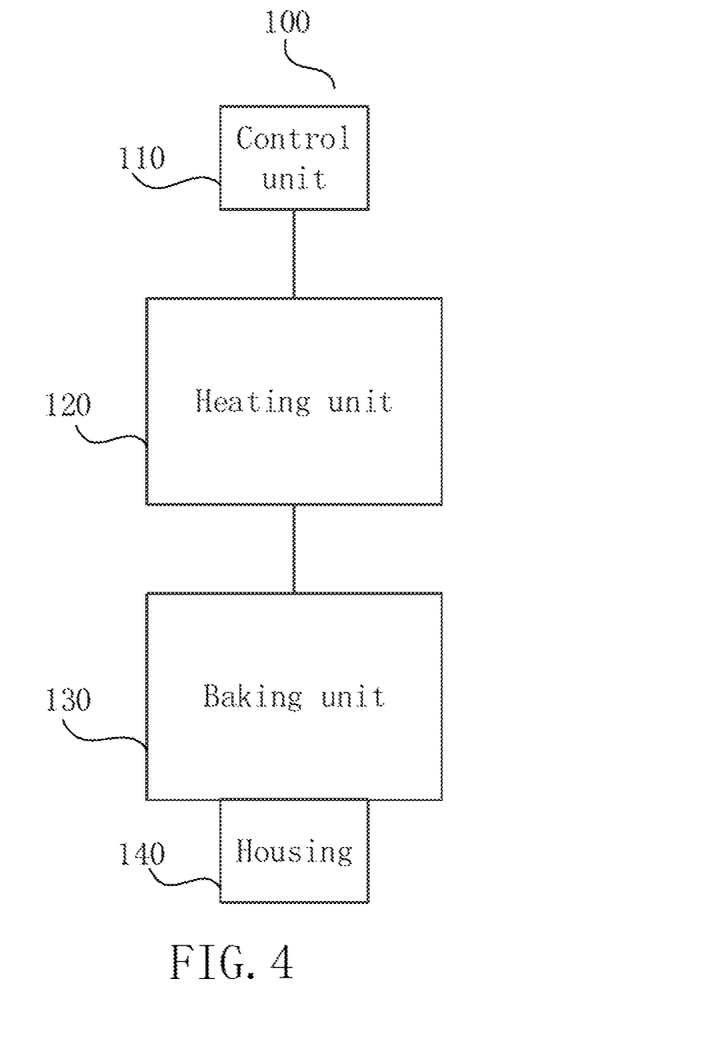
FIG. 4 is a schematic diagram of a baking device for a display panel of an embodiment of the application.
Figure 5:
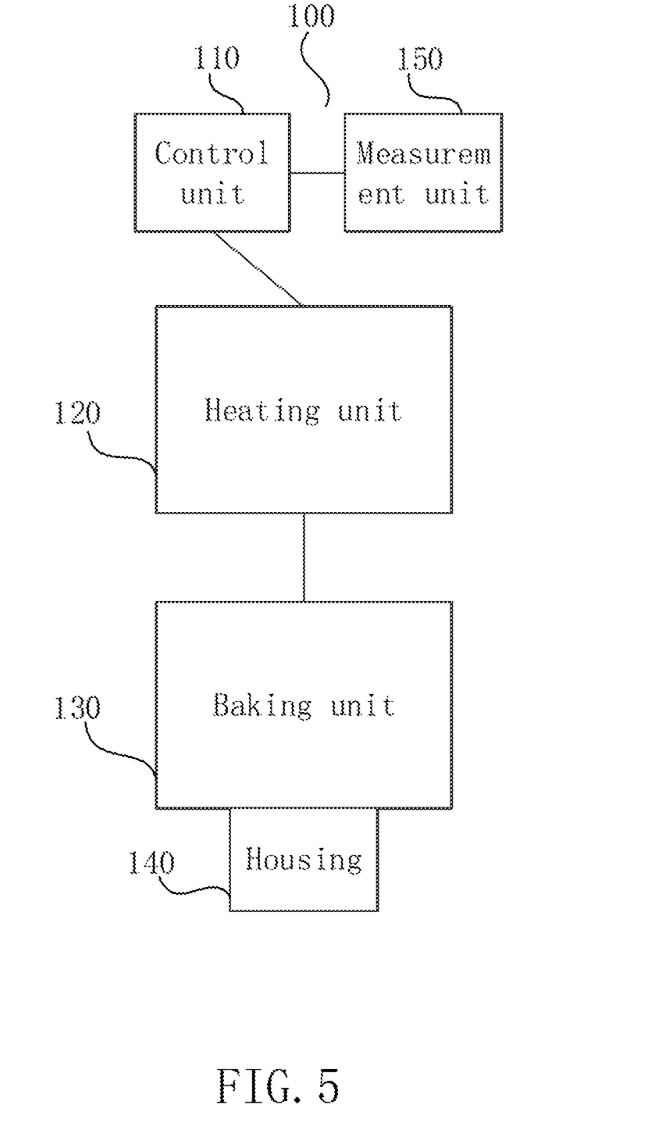
FIG. 5 is a schematic diagram of a baking device for a display panel of an embodiment of the application.

According to an embodiment of the application, as shown in FIG. 3 to FIG. 5, an embodiment of the application discloses a baking device 100 for a display panel, the baking device comprising: a heating unit 120, a baking unit 130 and a control unit 110.

The heating unit 120 is used for generating heat. In an embodiment of the application, the heating unit includes any of the following: a microwave emitter, an infrared ray emitter or an ultraviolet ray emitter. The heating unit can emit microwaves when being a microwave emitter, to bake the support unit by microwaves. The heating unit can emit infrared rays when being an infrared ray emitter, to bake the support unit by infrared rays. The heating unit can emit ultraviolet rays when being an ultraviolet ray emitter, to bake the support unit by ultraviolet rays.

The baking unit 130 is connected to the heating unit 120, and is used for baking a support unit of the display panel until the support unit is lowered to a predetermined height. The predetermined height in an embodiment of the application is determined according to the internal setting of the display panel).

The display panel in an embodiment of the application may include any of the following: a twisted nematic (TN) or super twisted nematic (STN) type panel, an in-plane switching (IPS) type panel, a vertical alignment (VA) type panel, a high vertical alignment (HVA) type panel and a curved surface type panel.

That is to say, the baking device in an embodiment of the application may be used in any of the following display panels: a twisted nematic (TN) or super twisted nematic (STN) type panel, an in-plane switching (IPS) type panel, a vertical alignment (VA) type panel, a high vertical alignment (HVA) type panel and a curved surface type panel.

The control unit 110 is used for controlling the heating unit 120. The control unit 110 in an embodiment of the application can control the heat radiated by the heating unit 120 to be quantitative heat. Baking performed on the support unit is achieved by changing the continuous heating time of the heating unit, so that the support unit is lowered to the predetermined height. This is one specific manner of baking a support unit. The strength of the baking is adjusted to an appropriate strength, that is, the heat radiated by the heating unit is unchanged, the support unit is gradually contracted by controlling the time of the baking, and until the support unit is lowered to the predetermined height to form a support unit with a normal height, baking is completed. In the baking process, time may be easily controlled, and a slight-adjustment correction effect may be achieved, so that the difference between the height of the support unit after slight-adjustment correction and the predetermined height is further reduced.

However, it should be noted that the manner of baking the support unit in an embodiment of the application is not limited thereto. For example, the time of the baking is unchanged, that is to say, the time of radiating heat by the heating unit is unchanged, and the support unit is lowered to the predetermined height by controlling the strength of the baking, that is, the support unit is lowered to the predetermined height by controlling different heat radiated by the heating unit. The time of the baking is set, the support unit is contracted by controlling the strength of the baking, and until the support unit is lowered to the predetermined height, baking is completed. In the baking process, the strength of the baking may be controlled as well, that is, heat radiated by the heating unit may be controlled as well, and the slight-adjustment correction effect may be achieved as well, so that the difference between the height of the support unit after slight-adjustment correction and the predetermined height is further reduced.

Further, as shown in FIG. 4, the baking device 100 of an embodiment of the application further comprises a housing 140 sleeved on the periphery of the baking unit 130. The baking device 100 can preferably achieve the effect of local baking through the housing 140.

Furthermore, as shown in FIG. 5, the baking device 100 of an embodiment of the application further comprises a measurement unit 150, wherein the measurement unit 150 is connected to the control unit 110, and the measurement unit 150 is used for measuring the height of each support unit. The measured height of the support unit is compared with a predetermined height, and if the height of a support unit is greater than the predetermined height, the support unit with a height greater than the predetermined height is baked by the baking device, so that the support unit is lowered to the predetermined height.

Figure 6:
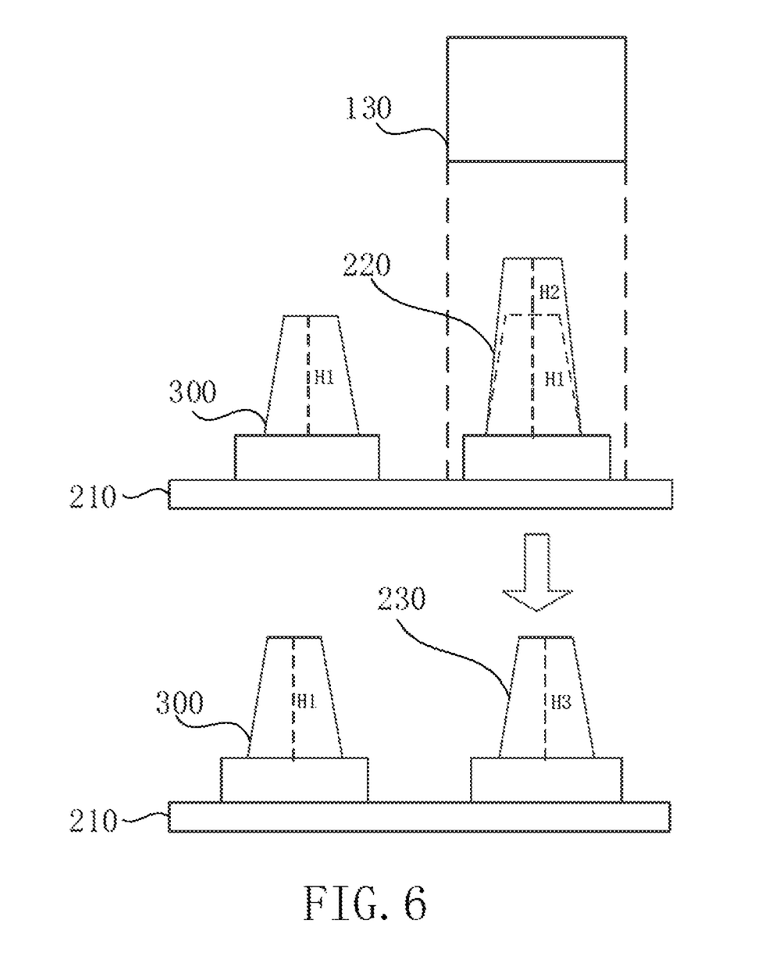
FIG. 6 is a procedure chart of baking one of support units by a baking device of an embodiment of the application.

In some embodiments of the application, as shown in FIG. 6, FIG. 6 is a procedure chart of baking one of support units by a baking device, where FIG. 6 only shows the baking unit 130 of the baking device. Specifically, in the application, a color filter is coated on a transparent substrate 210 of a display panel, and is patterned and solidified to form a first support unit 220. To perform comparative analysis, a standard support unit 300 with a normal height is also arranged on the transparent substrate 210 of the display panel. Wherein the standard support unit 300 has a height of H1, and H1 is defined as a predetermined height in some embodiments of the application; and the height of the first support unit 220 is the sum of H1 and H2, H2 is greater than zero, and the height H2+H1 of the first support unit 220 is greater than the height H1 of the standard support unit 300. Where the dotted portion in the first support unit 220 represents the size of the standard support unit. In the application, the bake device is used to align the baking unit 130 with the first support unit 220. However, when the first support unit 220 is baked, the first support unit is slightly contracted in the baking process. After baking is completed, the first support unit 220 becomes a second support unit 230, and the height H3 of the second support unit 230 is equal to the height H1 of the first support unit. Thus, slight-adjustment correction performed on the first support unit 220 is achieved, to prevent the first support unit from being slightly high in local part, and then prevent undesirable phenomena of slightly white and nonuniform lighting of the display panel, so that the display panel can normally display.

However, it should be noted that there is a small difference between the height H3 and the height H1 in embodiments of the application, which is within the difference range of 10%, and if the difference between height H1 and height H3 is within the difference range, it is determined that the height H1 is equal to the height H3.

The above contents are further detailed descriptions of the application in combination with specific preferred embodiments. However, the specific implementation of the application shall not be considered to be only limited to these descriptions. For those of ordinary skill in the art to which the application belongs, several simple deductions or replacements may be made without departing from the conception of the application, all of which shall be considered to belong to the protection scope of the application.

What is claimed is:

1. A method for manufacturing a display panel, comprising:
   coating a color filter on a transparent substrate of a display panel;
   patterning and solidifying the color filter to form at least one support unit, a standard support unit with a predetermined height is arranged on the transparent substrate of the display panel; and
   baking the support unit until the support unit is lowered to the predetermined height, wherein in the step of baking the support unit until the support unit is lowered to the predetermined height, maintaining strength of the baking, and the support unit is lowered to the predetermined height by controlling time of the baking; or
   wherein in the step of baking the support unit until the support unit is lowered to the predetermined height, the time of the baking is unchanged, and the support unit is lowered to the predetermined height by controlling the strength of the baking.

2. The method for manufacturing the display panel according to claim 1, wherein in the step of baking the support unit until the support unit is lowered to a predetermined height comprises:
   measuring a height of each support unit; and
   baking a support unit having an abnormal height until the support unit is lowered to the predetermined height.

3. The method for manufacturing the display panel according to claim 1, wherein in the step of baking the support unit until the support unit is lowered to a predetermined height, the support unit is baked using infrared rays.

4. The method for manufacturing the display panel according to claim 1, wherein in the step of baking the support unit until the support unit is lowered to a predetermined height, the support unit is baked using microwaves.

5. The method for manufacturing the display panel according to claim 1, wherein in the step of baking the support unit until the support unit is lowered to a predetermined height, the support unit is baked using ultraviolet rays.

6. The method for manufacturing the display panel according to claim 1, wherein the standard support unit has a height of H1, and H1 is defined as the predetermined height, the support unit having a height greater than HI is classified to aberrant, baking the support unit until the support unit is lowered to the predetermined height H1.

7. The method for manufacturing the display panel according to claim 6 wherein only the support unit having aberrant height is masked to bake the support unit until the support unit is lowered to the predetermined height H1.

8. The method for manufacturing the display panel according to claim 7 wherein only the support unit having aberrant height is masked and the standard support unit with a predetermined height is exposed.

9. The method for manufacturing the display panel according to claim 7 wherein only one single support unit having aberrant height is masked to bake the support unit until the support unit is lowered to the predetermined height H1.

10. The method for manufacturing the display panel according to claim 7 wherein only one single support unit having aberrant height is masked and the standard support unit with a predetermined height is exposed.

11. A baking device for a display panel, wherein the baking device comprises:
   a heating unit used for generating heat;
   a baking unit connected to the heating unit and used for baking a support unit of the display panel until the support unit is lowered to a predetermined height, a standard support unit with a predetermined height is also arranged on the transparent substrate of the display panel;

wherein the baking unit used for baking the support unit until the support unit is lowered to the predetermined height comprising maintaining strength of the baking, and the support unit is lowered to the predetermined height by controlling time of the baking; or the time of the baking is unchanged, and the support unit is lowered to the predetermined height by controlling the strength of the baking; and a control unit used for controlling the heating unit.

12. The baking device for a display panel according to claim 11, wherein the heating unit comprises a microwave emitter.

13. The baking device for a display panel according to claim 12, wherein the baking device further comprises a measurement unit connected to a control unit and used for measuring a height of each support unit.

14. The baking device for a display panel according to claim 12, wherein the standard support unit has a height of H1, and H1 is defined as the predetermined height, the support unit having a height greater than HI is classified to aberrant, baking the support unit until the support unit is lowered to the predetermined height H1.

15. The baking device for a display panel according to claim 14, wherein only the support unit having aberrant height is masked to bake the support unit until the support unit is lowered to the predetermined height H1 by the mask, and the standard support unit with a predetermined height is exposed.

16. The baking device for a display panel according to claim 11, wherein the heating unit comprises an infrared ray emitter.

17. The baking device for a display panel according to claim 11, wherein the heating unit comprises an ultraviolet ray emitter.

18. The baking device for a display panel according to claim 11, wherein the baking device further comprises a housing sleeved on the periphery of the baking unit.

* * * * *